Sept. 7, 1965    R. L. McILVAINE    3,204,302
METHOD AND APPARATUS FOR TREATING GRANULAR MATERIAL
Filed July 29, 1963    2 Sheets-Sheet 1

INVENTOR.
Robert L. McIlvaine
BY
Mason, Kolehmainen
Rathburn & Wyss
Atty's:

Sept. 7, 1965   R. L. McILVAINE   3,204,302
METHOD AND APPARATUS FOR TREATING GRANULAR MATERIAL
Filed July 29, 1963   2 Sheets-Sheet 2
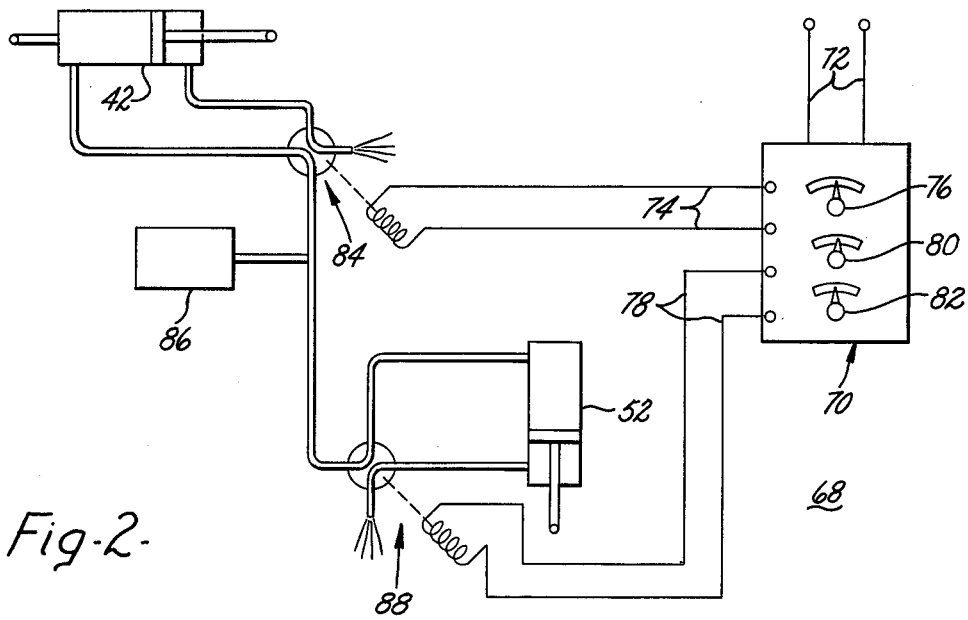
Fig-2-
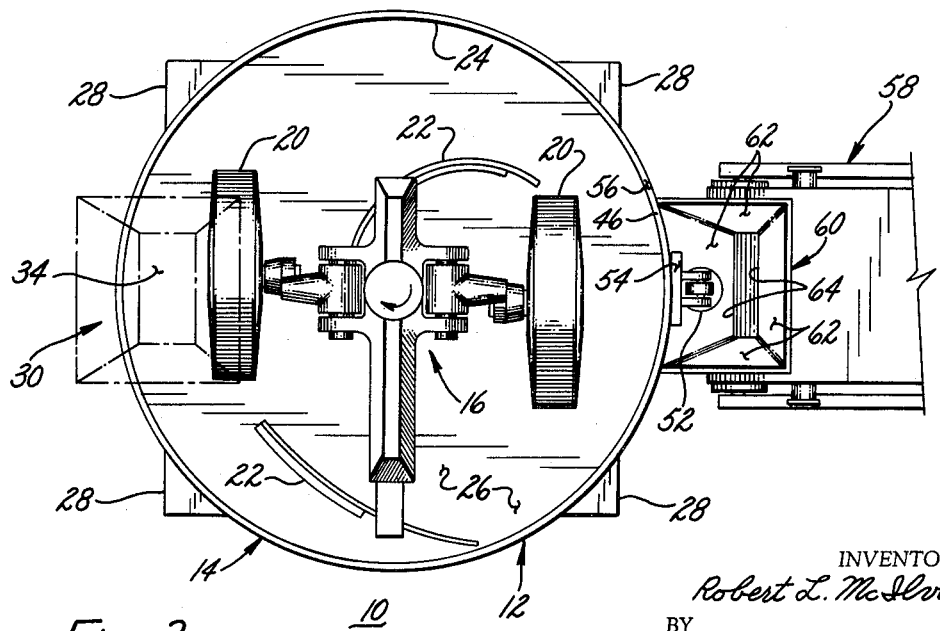
Fig-3-
INVENTOR.
Robert L. McIlvaine
BY
Mason, Kolehmainen
Rathburn & Wyss
Atty's United States Patent Office 3,204,302
Patented Sept. 7, 1965

3,204,302
METHOD AND APPARATUS FOR TREATING GRANULAR MATERIAL
Robert L. McIlvaine, Winnetka, Ill., assignor to Herbert Simpson Corporation, Chicago, Ill., a corporation of Illinois
Filed July 29, 1963, Ser. No. 298,339
8 Claims. (Cl. 22—89)

The present invention relates generally to a new and improved method and apparatus for treating granular material and more particularly to a new and improved method and apparatus for preparing foundry sand for use in molding operations.

One of the difficulties in preparing foundry sand from a fresh charge of dry sand mixed with water and a bonding agent in a conventional mulling machine is that it takes a considerable period of time for mulling and mixing in the machine before the water and bonding agent are sufficiently distributed throughout the sand so that the mixture achieves the so-called "plastic" condition necessary for making sand molds.

Accordingly, it is an object of the present invention to provide a new and improved method and apparatus for preparing foundry sand and the like wherein the time required for mixing a batch of the material is greatly reduced.

In the conventional batch system for preparing foundry sand, the raw materials are charged into a mixer-muller in the desired amounts and then continually mixed and mulled until the mixture is in a "plastic" condition, at which time the mixture is discharged from the muller for use in molding. This process is repeated for each new batch and has the main disadvantage as before mentioned, of requiring a considerable time for mixing and mulling to get the mixture in the plastic condition ready for use and, consequently, the output per unit time of these systems is relatively low and depends largely on the size of the mixer. The advantages of the system are the relatively low cost of initial installation of equipment and the accurate control of the amount of ingredients in each batch that can be obtained.

Continuous type systems are utilized in large foundries where high outputs are required. These systems are costly in that they require flowrating equipment, rather complex material handling and storage facilities and larger mixing and mulling units for continuous output.

Thus, it is an object of the present invention to provide a new and improved method and apparatus for preparing foundry sand and the like which combines many of the advantages of both batch and continuous type systems while eliminating many of the disadvantages of both types.

More specifically, it is an object of the present invention to provide a new and improved method and apparatus for treating foundry sand wherein a relatively small size mixing and mulling unit is used in a manner to produce relatively high rates of output.

Along this line, it is an object of the present invention to provide a new and improved system for treating foundry sand wherein the cost of the facility is relatively low with accurate measuring of the ingredients being easily obtainable, as in a batch system, yet the output per unit time of finished foundry sand is relatively high, as in a continuous system.

Yet another object of the present invention is the provision of a new and improved system for preparing foundry sand wherein a relatively small, batch type mixer-muller can be modified and utilized to produce a high output rate of high quality finished sand by providing for continuous mulling and mixing of the material during operation.

These and other objects and advantages of the present invention are accomplished by the provision of a new and improved method of preparing foundry sand and the like wherein a mixed batch of sand, water and bonding agent is continually mixed and mulled in a mulling chamber, and a predetermined amount of additional solid material is then added to the batch for a selected period of time to obtain an averaged mixture in the mulling chamber. At the end of the selected period of time, an amount of the averaged mixture substantially equal to the predetermined amount of solid material introduced is discharged from the chamber for use in molding.

By retaining a quantity of the mixture in the mulling chamber under continuous mixing and mulling and adding predetermined amounts of solid material, as described above, the time required for each batch discharged from the chamber is greatly reduced and the rate of output approaches that of a continuous process while still retaining the advantage of a batch system.

Briefly, an apparatus of the present invention comprises a mulling chamber for containing a quantity of material and means therein for continually mixing and mulling the material. Charging means are provided above the chamber for introducing controlled amounts of solid material, and there is also provided a discharge means including a door in the mulling chamber for discharging a predetermined quantity of material from the chamber. Additionally, there is provided a timing means for controlling the actuation of and synchronizing the action of the charging means and discharge means, in order to control the amount of material charged into and discharged from the chamber, and the selected period of time between charging and discharging of the material.

For a better understanding of the present invention, reference should be had to the following detailed description and the drawings, in which:

FIG. 2 is a schematic diagram of the timing and control means for controlling the apparatus of FIG. 1; and FIG. 3 is a top plan view of the apparatus of FIG. 1.

Figure 1:
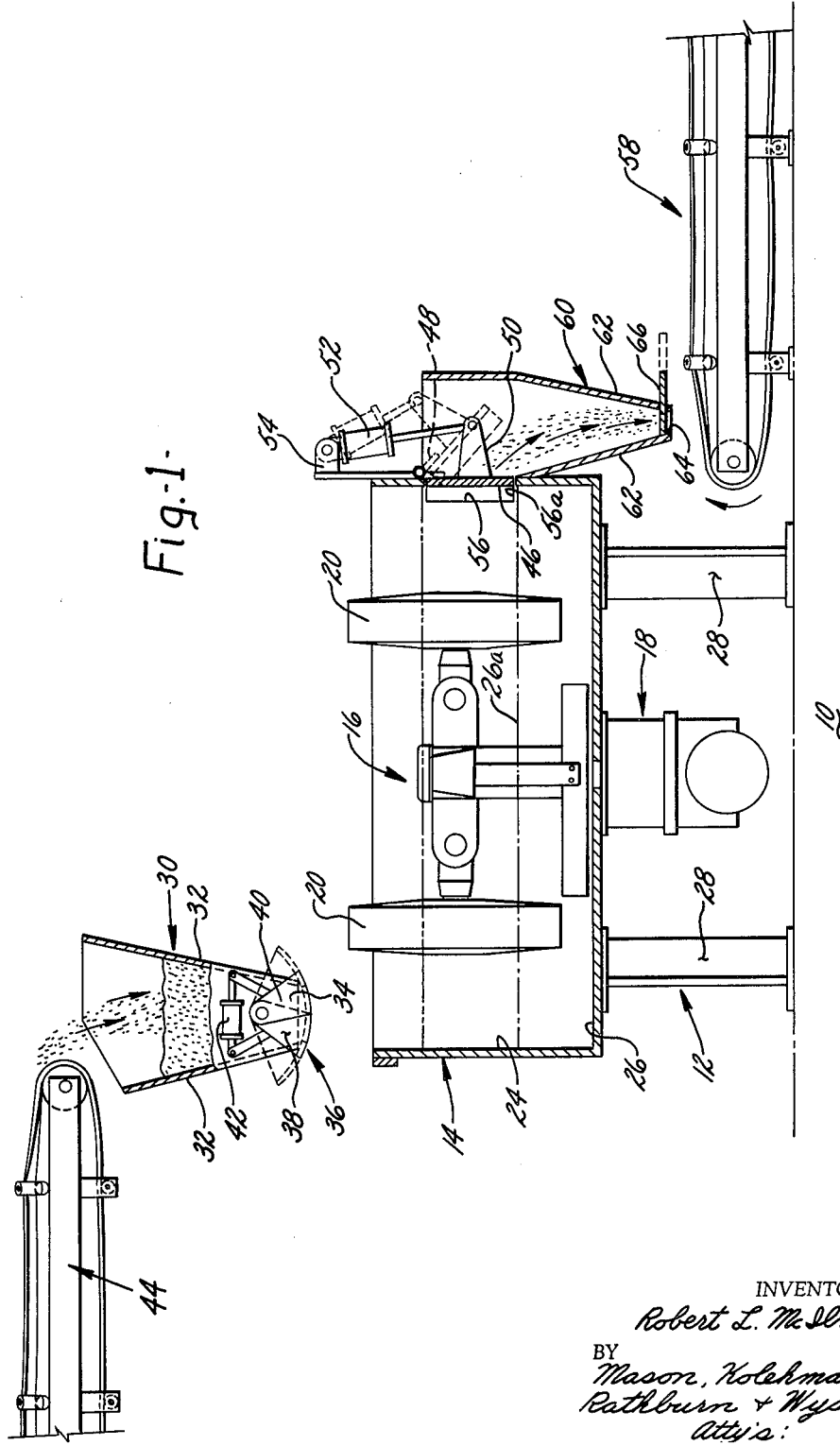
FIG. 1 is a side elevational view with portions in section of the new and improved apparatus of the present invention.

Referring now more particularly to the drawings, there is illustrated a new and improved apparatus for preparing foundry sand and the like, indicated generally by the reference numeral 10, which is constructed in accordance with the features of the present invention.

The apparatus 10 includes a mulling and mixing machine 12 having a cylindrical mulling chamber or crib 14 and a rotating head 16 which is driven by a drive unit 18 beneath the chamber. The head 16 includes a pair of mulling wheels 20 and a pair of scraper blades or plows 22 for agitating, mulling and mixing the material in the chamber 14 as the head 18 rotates. The mulling chamber 14 includes a cylindrical side wall 24 and a bottom wall or wear plate 26 and the chamber is adapted to be supported from the floor or other surface by a plurality of legs or columns 28.

In order to introduce a charge of sand or other granular material into the crib 14 of the machine 12, there is provided an overhead charging hopper 30 having sloped side walls 32 which form a discharge opening 34 at the bottom thereof. In order to control the flow of material from the opening 34 into the crib 14, there is provided a clam-shell door mechanism 36 including a pair of clam-shell doors 38 and 40 pivotally attached to the side walls 32 of the hopper. The doors 38 and 40 are illustrated in their closed position in solid lines in FIG. 1 with their open position being shown in dotted lines. Also, the doors can be controlled to open or close or move to a position intermediate therebetween by means such as the pneumatic cylinder 42. The hopper 30 can be filled automatically by means such as the overhead belt conveyor 44 or manually by a shovel or wheelbarrow.

In order to provide for the discharge of material from the crib 14 after it is properly conditioned, the wall 24 is provided with a discharge door 46 secured thereto by a hinge 48. The door 46 is curved to conform with the crib wall 24 and is provided with an extending arm 50 for actuation by a pneumatic cylinder 52 having one end pivotally attached thereto and the other end pivotally attached to a bracket 54 secured to the crib wall.

The door 46 is adapted to open and close an opening 56 in the crib wall 24 having a lower edge 56a which is spaced at a predetermined level 26a above the bed plate 26 of the mixer. In FIG. 1 the door 46 is shown in its closed position in solid lines and in its fully open position in dotted lines and the cylinder 52 can be actuated to intermediate positions therebetween to obtain the desired flow-rates of sand through the opening 56 in the crib.

In order to direct the flow of material from the opening 56 onto suitable conveyor means such as a belt conveyor 58 without spillage there is provided a discharge hopper 60. The hopper 60 is provided with sloping side walls 62, the lower ends of which form a discharge opening 64. A sliding gate 66 is provided to control the flow of material from the hopper 60 through the discharge opening 64 onto the belt 58.

In order to control the operation of the clam-shell door assembly 36 on the charging hopper 30 and the discharge door 46 of the mixer 12, there is provided a control system 68 illustrated schematically in FIG. 2 of the drawings. The system 68 includes a timing device such as the electrically operated timer 70 which is connected to a suitable power source by the leads 72. The timer is provided with a first timed circuit having output leads 74 controlled by an adjustable time setting knob 76 and a second timed circuit having output leads 78 controlled by an adjustable time setting knob 80. A third circuit is provided in order that the time interval between actuation of the first circuit and second circuit can be adjustably controlled and set for a predetermined, desired time interval. This time interval is controlled by an adjustable time setting knob 82.

The output leads 74 of the first timed circuit are connected to a solenoid operated air valve 84 which is biased to direct compressed air from a suitable source 86 into the cylinder 42 causing the rod to be extended closing the clam-shell door assembly 36 when there is no current flowing in the leads 74. When the timer 70 causes a current to flow in the first circuit leads 74 for a timed interval, as adjustably selected by the knob 76, the solenoid air valve 84 is energized and moves to direct the air flow into the cylinder 42 to cause the rod to be retracted thereinto and open the clam-shell door assembly for the timed interval as set by the knob 76. When the timed interval is over, current ceases to flow in the leads 74, and the valve 84 becoming deenergized is biased to return to the position shown closing the clam-shell door assembly and shutting off the flow of sand into the mixmuller 12.

Neither the first nor second timed circuits are energized during a preselected time period controlled by a third circuit and adjusted for the desired length by the knob 82. During this time the newly added charge of solid material is mixed with the material already in the mixer. When this time interval elapses, the second timed circuit energizes the output leads 78 for a predetermined period of time selectively adjustable by means of the knob 80. During this time interval, current from the leads 78 energizes a solenoid operated air valve 88 which directs a flow of compressed air from the source 86 to cause the rod of cylinder 52 to retract and open the discharge door 46 allowing the mixed material in the mixer to flow out through the discharge opening 56 into the discharge hopper 60. The air valve 88 is biased to direct the compressed air to extend the rod of the cylinder 52, closing the discharge door 46 when the valve is deenergized and, consequently, at the end of the selected time period of the second timed circuit the door closes. At this point the first timed circuit again becomes activated and causes the clam-shell doors 36 to open and the whole process is repeated.

Since the three timed circuits of the timer 70 can be individually adjusted for selected periods of time by the knobs 76, 80 and 82, the charging rate, discharging rate and mixing interval in between can be adjusted as desired. Additionally, the charging and discharging rates can be adjusted by changing the length of stroke of the cylinders 42 and 52 as desired or by changing the rapidity of action of these cylinders by adjusting the air pressure from the air compressor to the desired level.

In operation, a batch of sand, bonding agent and water is maintained in the crib 14 of the mixer and is continually mixed and mulled by the rotating head assembly 16 attaining a "plastic" condition as desired for use in molding operations. The mixture is maintained in the crib at a level approximately equal to the level 26a at the bottom edge 56a of the discharge door 56. As a typical example, in a mixer having a normal rated capacity of 2,000 lbs., the door 56 will be positioned in the side wall 24 so that the amount of material in the crib up to the level 26a will be 1,500 lbs. This amount will be maintained in the mixer regardless of whether the discharge door is opened or closed.

As the 1,500 lb. batch in the mixer is being continually mixed and mulled to maintain the mixture in a "plastic" condition, a predetermined amount (500 lbs.) of dry solid material is added to the mixture through the clam-shell door assembly 36 of the charging hopper 30. The amount of material added is controlled by the time interval set up on the first timed circuit of the timer 70. The newly added dry material is then mixed with the already "plastic" mixture in the mixer for a selected interval of time as controlled by the third timed circuit of the timer 70. It has been found that when a relatively small amount (500 lbs.) of dry material is added to a relatively large amount (1,500 lbs.) of thoroughly mixed material in the plastic state, a much shorter mixing time is required to attain a mixture of the two which is suitable for use in molding than if a whole 2,000 lb. batch was mixed up from raw materials originally.

After the selected interval of time for mixing has elapsed, the discharge door 56 is opened for a time interval to discharge substantially the same amount of material (500 lbs.) as was added to the mixture from the charging hopper 30. The discharge time interval is controlled by the second timed circuit of the timer 70 and may be adjusted as necessary to insure that the continually mixed batch of material in the mixer remains susbtantially constant (1,500 lbs.).

At the end of the discharge period, the discharge door 56 is closed and the cycle is repeated with the first timed circuit of the timer 70 causing the clam-shell door assembly 36 to open to add new solid material. Bonding agent and water may be continually added to the base mixture in the crib 14 to maintain the mixture therein in a "plastic" condition as it is being continually mulled and mixed.

The charging hopper 30 can be continuously supplied with solid material by the conveyor 44, and as such occurs, the hopper acts as an accumulator or storage hopper for the material between charging operations in the cycle. Likewise, the discharge hopper 60 acts as a storing or accumulator for continuously feeding the conveyor 58 at a slow rate between operation of the discharge 56. Thus, even though the system is basically a batch type system, the flow to and from the mixer 12 can be more or less continuous. This results in the advantage that conveyors of relatively limited capacity can be used since the entire 2,000 lbs. capacity of the mixer is not dumped all at once on the conveyor after mixing.

In addition to these advantages, by maintaining a large mixture of material in the mixer at all times and adding a discharging, preselected amount of dry solid material, the output for any given size mixer per unit time is greatly increased from that of the same mixer used in the conventional batching method where a new batch is mixed up from scratch each time and then discharged completely before another batch is started.

In another example utilizing a 2,000 lb. capacity mixer, it has been found that by maintaining a base mixture of 1,500 lbs. in the crib at all times and adding 500 lbs. of dry sand from the hopper 30 and appropriate amounts of water and bonding agent as rapidly as possible, mixing the material for 15 seconds and then opening the discharge door 56 for 15 seconds, an average discharge rate of nearly 1,000 lbs. per minute can be obtained. Inasmuch as the mixer has a 2,000 lb. capacity, the sand mixture therein will receive an average equivalent of 2 minutes mulling time.

The charging hopper 30 is positioned diametrically opposite the discharge door 56 if possible, and it is estimated that when the discharge door is first opened the discharging mixture will include about 8% of the newly added sand which will have been mulled with the already "plastic" mixture in the mixer for approximately 3 revolutions of the head assembly 16. As the discharge continues during the 15 second period the door is opened, the discharged material, of course, will have had a correspondingly longer mixing time.

Thus, the present invention provides for greatly increased productivity approaching or equalling that of much more extensive continuous systems. Moreover, conventional batch types mixers can be modified in accordance with the features of the present invention to provide such high productivity rates.

While a particular embodiment of the present invention has been shown and described, it will be understood that various modifications will occur to those skilled in this art and, it is, therefore, contemplated by the appended claims to cover all such modifications that fall within the true spirit and scope of the invention.

What is claimed as new and desired to be secured by Letters Patent of the United States is:

1. A method of rapid-batch mulling employed in treating foundry sand which comprises forming a mixed batch of sand and bonding material in a mulling chamber, continuously mulling said batch, introducing a predetermined amount of sand to said batch, mixing the predetermined amount of sand with said batch for a selected period of time to obtain averaged material in the mulling chamber, and discharging from said mulling chamber at the expiration of said period an amount of averaged material substantially equal to the predetermined amount of sand introduced to said batch.

2. A method of rapid-batch mulling which comprises forming a mixed batch of material in a mulling chamber, continuously mulling said batch, introducing a predetermined amount of additional solid material to be mixed with said batch, mixing the predetermined amount of solid material with said batch for a selected period of time to obtain averaged material in the mulling chamber, and discharging from said mulling chamber at the expiration of said period an amount of averaged material subsatntially equal to the predetermined amount of solid material introduced to said batch.

3. A method of rapid-batch mulling employed in the treatment of foundry sand wich comprises forming a mixed batch of sand and bonding material in a mulling chamber, continuously mulling said batch, periodically introducing predetermined amounts of sand to said batch at spaced intervals, mixing the introduced sand into said batch for a selected period of time to obtain averaged material in the mulling chamber, and discharging from said mulling chamber at the expiration of said period and during the time between each of said spaced intervals an amount of averaged material substantially equal to the predetermined amount of sand introduced to said batch.

4. A method of rapid-batch mulling which comprises forming a mixed batch of material in a mulling chamber, continuously mulling said batch, periodically introducing predetermined amounts of additional solid material to be mixed with said batch at spaced intervals, mixing each of said predetermined amounts of solid material with said batch for a selected period of time to obtain averaged material in the mulling chamber, and discharging from said mulling chamber at the expiration of said period and during the time between each of said spaced intervals an amount of averaged material substantially equal to the predetermined amount of solid material introduced to said batch.

5. A mulling apparatus comprising a mulling chamber for containing a batch of material, means for continuously mulling said material, means for introducing a predetermined amount of solid material to said mulling chamber to be averaged with said batch, means for discharging from said mulling chamber an amount of averaged material substantially equal to said predetermined amount, said discharging means including an opening formed in a side wall of said chamber and door means operable to open and close said opening, said opening disposed with a lower edge thereof positioned a predetermined distance above a bottom wall of said chamber for maintaining a selected amount of material in the chamber when said door means is open, and means including a timing device for operating the door means at a preselected interval after the solid material has been introduced into said mulling chamber.

6. A mulling apparatus comprising a mulling chamber for containing a batch of material, means for mulling said material, means for periodically introducing predetermined amounts of solid material during spaced intervals to said mulling chamber to be averaged with said batch, means for discharging from said mulling chamber an amount of averaged material substantially equal to said predetermined amount, said discharge means including a discharge opening formed in a side wall of said chamber at a predetermined level above a bottom wall of said chamber for maintaining a selected amount of material in the chamber at all times, and means for operating the discharging means at a preselected interval after each of the predetermined amounts of solid material has been introduced into said mulling chamber.

7. A mulling apparatus comprising a mulling chamber for containing a batch of material, said chamber including a cylindrical side wall and a bottom wall, crosshead means disposed within said chamber, mulling means connected to said crosshead means for mulling said material, means including a batch hopper for periodically introducing predetermined amounts of solid material to said mulling chamber to be averaged with said batch, means for discharging from said mulling chamber an amount of averaged material substantially equal to said predetermined amount, said discharging means including a discharge opening formed in said side wall a predetermined distance above said bottom wall for continuously maintaining a selected quantity of material in said chamber and door means operable to open and close said opening, and means including a timing device for operating said door means at a preselected interval after each of the predetermined amounts of solid material has been introduced into said mulling chamber from said batch hopper.

8. A mulling apparatus comprising a mulling chamber having upstanding side walls and a bottom wall for containing a batch of material, means for continuously mulling said material, means including a batch hopper for periodically introducing predetermined amounts of solid material during spaced materials to said mulling chamber to be averaged with said batch, means for periodically discharging from said mulling chamber amounts of averaged material substantially equal to each of said predetermined amounts, said means including a discharge opening formed in said side wall and spaced upwardly from said bottom wall a predetermined distance to maintain a quantity of averaged material in said chamber and door means operable to open and close said opening, and means including a timing device operable to open said door means to discharge material at a preselected interval after each of the predetermined amounts of solid material has been introduced to said mulling chamber from said batch hopper.

References Cited by the Examiner

UNITED STATES PATENTS 2,263,797  11/41  Christensen _____ 259—163
2,978,147  4/61  McInvaine.

CHARLES A. WILLMUTH, *Primary Examiner.*

UNITED STATES PATENT OFFICE
CERTIFICATE OF CORRECTION

Patent No. 3,204,302                            September 7, 1965

Robert L. McIlvaine

It is hereby certified that error appears in the above numbered patent requiring correction and that the said Letters Patent should read as corrected below.

Column 5, line 66, for "wich" read -- which --; column 6, line 72, for "materials" read -- intervals --.

Signed and sealed this 20th day of September 1966.

(SEAL)
Attest:

ERNEST W. SWIDER                                EDWARD J. BRENNER
Attesting Officer                                        Commissioner of Patents